United States Patent Office 3,732,207
Patented May 8, 1973

3,732,207
PREPARATION OF DEXTRINS AND STARCH ESTERS
Leslie P. Kovats, Granite City, Ill., assignor to Anheuser-Busch, Incorporated, St. Louis, Mo.
No Drawing. Filed Jan. 29, 1971, Ser. No. 111,097
Int. Cl. C08b *19/04*
U.S. Cl. 260—233.5
7 Claims

ABSTRACT OF THE DISCLOSURE

The disclosure describes a starch reaction product of dibasic organic acid anhydrides and specifically starch dextrin esters and thin boiling starch esters of dibasic organic acid anhydrides, preferably succinic or maleic anhydrides. The product is made by an essentially dry process involving the heating of intimately contacted starch or starch dextrin with dibasic organic acid anhydride at a temperature of 100–155° C. in the presence of only 0.5 to 15% moisture for selected times to produce a product of 0.02 to 0.04 degree of substitution.

These products are in unswollen granule form and are useful as adhesives and as thickening agents.

BACKGROUND OF THE INVENTION

This invention relates to a process of producing dextrin and starch esters of organic acids. The process relates more particularly to the preparation of low degree of substitution (D.S.) dextrin and starch esters in unswollen granule form, which comprises heating a dextrin or a thin boiling starch in the presence of a dibabasic organic acid anhydride, such as succinic or maleic anhydride or their mixtures. The invention further resides in the low D.S., unswollen, granular starch esters and dextrin esters produced.

The prior methods of making starch anhydride esters involved the use of water. In the present process, the reactants are dry blended in finely divided form and heated to react the same. The dry process reaction eliminates the usual drying, filtration, etc., steps of present processes and readily adapts to either a batch or continuous process.

Thus, it is a principal object of the present invention to provide a starch or dextrin ester of organic acid. Another principal object is to provide a process of making a starch or dextrin ester of organic acids which does not use water in the reaction. Still another object is to provide a dry reaction between starch or dextrins and succinic and maleic anhydride which produces a low degree of substitution in the resulting starch or dextrin ester. Still another object is to produce an unswollen granule reaction product of starch or dextrin and a dibasic anhydride.

These and other objects and advantages will be apparent hereinafter.

The present invention comprises a dry method of making starch and dextrin esters of dibasic organic acids and the products produced thereby.

DETAILED DESCRIPTION

The reaction of succinic or maleic anhydride with dextrin or starch can be directed to produce a low D.S. dextrin ester or starch ester under the conditions hereinafter set forth.

The process comprises heating a dextrin or starch containing about 3% moisture in the presence of an organic anhydride to produce an acidic environment at a temperature of about 130° C. for approximately one hour and recovering the resulting esterified product. It is desirable to have the starting materials (dextrin and anhydride) in as finely divided state as possible and this may be accomplished by known methods such as grinding and blending prior to the heating process. The dextrin or starch is 10 to 400 mesh in size, preferably 60 mesh. The acid anhydride has size of about 3½ to about 400 mesh preferably about 60 mesh. This invention provides a simple and economical method for the preparation of low D.S. dextrin and starch esters by eliminating the use of water and therefore the final steps of filtration, drying, etc. in the process. The dextrin or starch esters usually are used in the preparation of adhesives.

The moisture content of the reaction mixture composed of the dextrin or starch and, for example, succinic anhydride, at the time the reaction starts should be within the range of 0.5 to about 15 percent, and preferably is about 3% (based on the total weight of reactants).

The reactants are treated in a conventional dextrin roaster for about $\frac{1}{10}$ to about 10 hours and generally from about ½ to about 3 hours, preferably about 1 hour.

The reaction temperature may be 50–175° C. and generally should be about 100° C. to about 155° C., preferably about 130° C. When a higher reaction temperature is used it is necessary to shorten the reaction time in order to avoid decomposition of the product.

Means should be provided to constantly remove the water, which is a by-product of the reaction, during the heating process. This can be done by any conventional means, such as ambient air flow.

About 1 to about 15% water is removed from the reaction mix during the reaction.

The final water content of the product is 0.5 to about 5% by weight of final product.

The starting starch or dextrin has a degree of fluidity of 0 to 95 particularly 25 to 95. The starch or dextrin preferably are mixed with anhydride and ground in a mill to a 40 to 80 mesh size. The reactants may be ground together for preparation or may be ground separately and then mixed.

Suitable starches useful in the invention include unmodified, oxidized and thin boiling starches made by process of acid hydrolysis or hypochlorite oxidation.

Suitable dextrins include white and yellow dextrins made by roasting of starches in the presence of an acid catalyst.

British gums prepared by roasting starch in the absence of an acid catalyst are also suitable starting materials for this invention.

The organic acid anhydrides include succinic, maleic, phthalic, acetic, propionic, adipic, and anhydrides of mixtures of mono basic acids.

The amount of the organic acid anhydride may vary widely depending upon the degree of substitution desired. The amount of the anhydride should be within the range of about 0.1 to about 10 percent, preferably about 10%. This percent is percent by weight based on the weight of the starch or dextrin.

The final product has a degree of substitution of about 0.01 to about 0.1, preferably about 0.03.

The analysis of the dextrin, and starch products were made as hereinafter described, except that when various types of dextrins were treated with solid anhydride, the analysis of the product was complicated by the fact that the unreacted anhydride had to be extracted or washed out of the product in order to determine the extent of the substitution. The dextrins become gummy during this procedure and are difficult to handle. The dextrin anhydride reactions have been repeated using a thin-boiling starch and these products analyzed. These tests prove that the analysis of the dextrin, although not always exact, is of the correct order of magnitude.

ANALYSIS

The degree of substitution in the samples were determined by saponification with 0.5 N sodium hydroxide solution using dry pyridine as solvent and back-titrating with 0.5 N sulfuric acid using phenolphthalein as indicator. The acid content of the samples were determined directly with 0.5 N sodium hydroxide in presence of phenolphthalein indicator.

The adhesives made from dextrin esters are superior to the adhesives made from regular dextrins. In most cases a good bond was obtained in aluminum foil and paper laminations. Dextrin ester and urea combinations yielded excellent paper adhesives.

The following examples are illustrative of the products and processes of the present invention, but are not to be construed as limiting.

PREPARATION OF ORGANIC DIBASIC ESTERS OF DEXTRIN AND STARCH

Example No. 1

(A) Preparation of starch succinate.—Ten (10) pounds of thin boiling starch (60 fluidity) was dried to about 3% moisture content and 60 mesh size and blended with 0.5 lb. of pulverized succinic anhydride, of 60 mesh size. The mix was heated in a dextrin roaster for one hour at 140° C. and the starch succinate was recovered. The material balance of the succinic anhydride was excellent at 99% of the added reagent was accounted for. The product contained 1 succinyl group per 35 anhydroglucose unit (AGU) as a crosslinked diester and the remaining unreacted succinic acid and anhydride was recovered in the washings. 61% of the reagent was attached to the starch either as the mono or diester.

(B) Preparation of dextrin succinate.—100 lb. of white dextrin (2.6% moisture and 40 mesh size) was blended with 5 lb. of succinic anhydride flakes of 3½ mesh size. The mix was heated in a dextrin roaster for 1 hour at 140° C. and the product was recovered. The dextrin succinate contained 1 succinyl group per 32 AGU (as the half ester) which is comparable to the analogous starch succinate.

Formulation of adhesive

The adhesives made from dextrin succinates have shown excellent adhesion to various paper substrates. The dextrin succinates are useful in case sealing adhesives. The following adhesive was made from dextrin succinate, borax, and water.

Adhesive

| | G. |
|---|---|
| Dextrin succinate (from Ex. 1B) | 130 |
| Water | 120 |
| Borax (10 mol water) | 5 |
| Sodium hydroxide (30% aq.) | 1.5 |
| Dowicide G | 0.3 |

Adhesives prepared from dextrin succinate also are useful in aluminum foil-paper laminations. The following adhesive was made from dextrin succinate, sodium nitrate, and water.

Adhesive

| | G. |
|---|---|
| Dextrin succinate (from Ex. 1B) | 130 |
| Water | 120 |
| Sod. nitrate | 24 |
| Sod. hydroxide (30% aq.) | 1.5 |
| Dowicide G | 0.3 |

The dextrin succinate of Ex. 1B also is useful for the preparation of remoistenable gummed tape adhesives.

Example No. 2

(A) Preparation of starch maleate.—Ten (10) lb. of thin boiling starch (5% moisture and 40 mesh size) was blended with 0.5 lb. of maleic anhydride of 60 mesh size and reacted in the dextrin roaster for 75 minutes at 144° C. The product was recovered. The starch maleate had one-half ester group per 53 AGU.

(B) Preparation of dextrin maleate.—10 lb. of white dextrin (2.2% moisture and 60 mesh size) was reacted with 0.7 lb. of maleic anhydride of 40 mesh size for 70 minutes at 141° C. The dextrin ester was recovered. The dextrin ester had one-half ester group per 36 AGU.

The dextrin maleates are useful in case sealing adhesives. The adhesives made from dextrin maleates gave good fiber tear with kraft paper and held aluminum foil as well as the dextrin succinate adhesives.

Example No. 3

Preparation of a mixed dextrin ester.—12 lb. of dextrin (3% moisture and 40 mesh size) was reacted with 0.5 lb. of 1:1 mixture of succinic and maleic anhydrides of 40 mesh size at 140° C. for 2 hours and the product was recovered. The product was used in case sealing and in paper laminating adhesives.

Example No. 4

Preparation of starch dextrin succinate.—The procedure outlined in Example No. 3 was followed except for the following changes. A dextrin and thin boiling starch blend of 60 mesh size and 5% of moisture (4:1 ratio) was used. 10 lb. of dextrin and starch blend was reacted with 0.6 lb. of succinic anhydride at 146° C. for 50 minutes and the product was recovered. This product too is useful in the adhesive field.

What is claimed is:

1. A method of making esters of starch based products which consists essentially of providing a mixture of starch based reactant and dibasic acid anhydride having a moisture content of about 0.5% to about 15% by weight, said starch based reactant and said dibasic acid anhydride each being in pulverized form and intimately blended in said mixture, said acid anhydride being present in amount of about 0.1% to about 10% by weight of the starch based reactant whereby to provide an acidic environment for the mixture, heating said mixture within the temperature range of about 50° C. to about 175° C. while constantly removing the water formed as a by-product, and continuing such heating for about 1/10 to about 10 hours until the degree of substitution is about 0.01 to about 0.1.

2. The method of claim 1 wherein the starch based reactant is an unmodified, oxidized or thin boiling starch of 0 to 95 degree fluidity.

3. The method of claim 1 wherein the starch based reactant is a dextrin of 25 to 95 degree fluidity.

4. The method of claim 1 wherein the dibasic acid anhydride is selected from the group consisting of maleic, succinic and mixtures thereof.

5. The method of claim 1 wherein the moisture level during the reaction is maintained in the range of about 1 to about 5%, based on the weight of total ingredients.

6. The reaction of claim 1 wherein the starch based reactant has a mesh size of 10 to 400 and the dibasic acid anhydride has a mesh size of 3½ to 400.

7. The method of claim 1 wherein the starch based reactant is selected from the group consisting of thin boiling, oxidized and unmodified starches and starch dextrins and the dibasic acid anhydride is selected from the group consisting of maleic, succinic and mixtures thereof.

References Cited

UNITED STATES PATENTS

| 2,461,139 | 2/1949 | Caldwell | 260—233.5 |
| 2,914,526 | 11/1959 | Paschall | 260—233.5 |
| 3,580,906 | 5/1971 | Bernasek et al. | 260—233.5 |
| 2,340,338 | 1/1944 | Murray | 106—210 |

DONALD E. CZAJA, Primary Examiner

M. I. MARQUIS, Assistant Examiner

U.S. Cl. X.R.

106—213; 117—127, 156; 161—220; 260—209 R, 233.3 R